United States Patent [19]

Hearn

[11] Patent Number: 5,234,234
[45] Date of Patent: Aug. 10, 1993

[54] CONDUIT COUPLING

[76] Inventor: Steve M. Hearn, 2073 Marian Ave., Carson City, Nev. 89706

[21] Appl. No.: 886,594

[22] Filed: May 21, 1992

[51] Int. Cl.$^5$ .............................. F16L 25/06
[52] U.S. Cl. .................. 285/328; 285/404; 285/419; 285/915
[58] Field of Search ............... 285/404, 373, 419, 915, 285/328

[56] References Cited

U.S. PATENT DOCUMENTS

| | | | |
|---|---|---|---|
| 2,403,839 | 7/1946 | Adolph | 285/419 X |
| 2,449,795 | 9/1948 | Stillwagon | 285/373 X |
| 2,598,338 | 5/1952 | Arbogast | 285/419 X |
| 3,333,046 | 7/1967 | Margis | 285/915 X |
| 4,150,848 | 4/1979 | Dyrup | 285/328 X |
| 4,304,424 | 12/1981 | Hansen | 285/404 X |
| 4,789,189 | 12/1988 | Robertson | 285/328 X |
| 5,026,096 | 6/1991 | Lutz | 285/373 X |

Primary Examiner—Dave W. Arola
Attorney, Agent, or Firm—Leon Gilden

[57] ABSTRACT

A conduit coupling includes a plurality of semi-cylindrical shells hingedly mounted relative to one another to receive first and second conduits therewithin. Externally threaded clamp rods are radially directed through the first shell to secure the first and second conduits within the coupling structure. The first and second shells include respective flanges at a second edge of each shell that are arranged for confronting and contiguous relationship when in a closed orientation relative to one another, with a flange fastener directed through the first shell flange threadedly received within the second shell flange to clamp the first and second shells relative to one another.

1 Claim, 4 Drawing Sheets

CONDUIT COUPLING

BACKGROUND OF THE INVENTION

1. Field of the Invention

The field of invention relates to conduit coupling structure, and more particularly pertains to a new and improved conduit coupling wherein the same is arranged to effect the rapid securement of first and second conduits relative to one another.

2. Description of the Prior Art

Conduit couplings of various types have been utilized in the prior art to secure conduits typically in an end-to-end relationship relative to one another. Such structure is exemplified in the U.S. Pat. Nos. 4,951,975; 4,991,626; 4,917,149; 4,957,314; and 4,946,202.

The prior art structures have typically been of elaborate construction not availed of the rapid mounting of couplings in an end-to-end relationship as directed by the instant invention and in this respect, the present invention substantially fulfills this need.

SUMMARY OF THE INVENTION

In view of the foregoing disadvantages inherent in the known types of conduit coupling structure now present in the prior art, the present invention provides a conduit coupling wherein the same utilizes hingedly mounted semi-cylindrical shells arranged for securement relative to one another to receive and mount aligned conduits therewithin. As such, the general purpose of the present invention, which will be described subsequently in greater detail, is to provide a new and improved conduit coupling which has all the advantages of the prior art conduit coupling apparatus and none of the disadvantages.

To attain this, the present invention provides a conduit coupling including a plurality of semi-cylindrical shells hingedly mounted relative to one another to receive first and second conduits therewithin. Externally threaded clamp rods are radially directed through the first shell to secure the first and second conduits within the coupling structure. The first and second shells include respective flanges at a second edge of each shell that are arranged for confronting and contiguous relationship when in a closed orientation relative to one another, with a flange fastener directed through the first shell flange threadedly received within the second shell flange to clamp the first and second shells relative to one another.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved conduit coupling which has all the advantages of the prior art conduit coupling apparatus and none of the disadvantages.

It is another object of the present invention to provide a new and improved conduit coupling which may be easily and efficiently manufactured and marketed.

It is a further object of the present invention to provide a new and improved conduit coupling which is of a durable and reliable construction.

An even further object of the present invention is to provide a new and improved conduit coupling which is susceptible of a low cost of manufacture with regard to both materials and labor, and which accordingly is then susceptible of low prices of sale to the consuming public, thereby making such conduit couplings economically available to the buying public.

Still yet another object of the present invention is to provide a new and improved conduit coupling which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
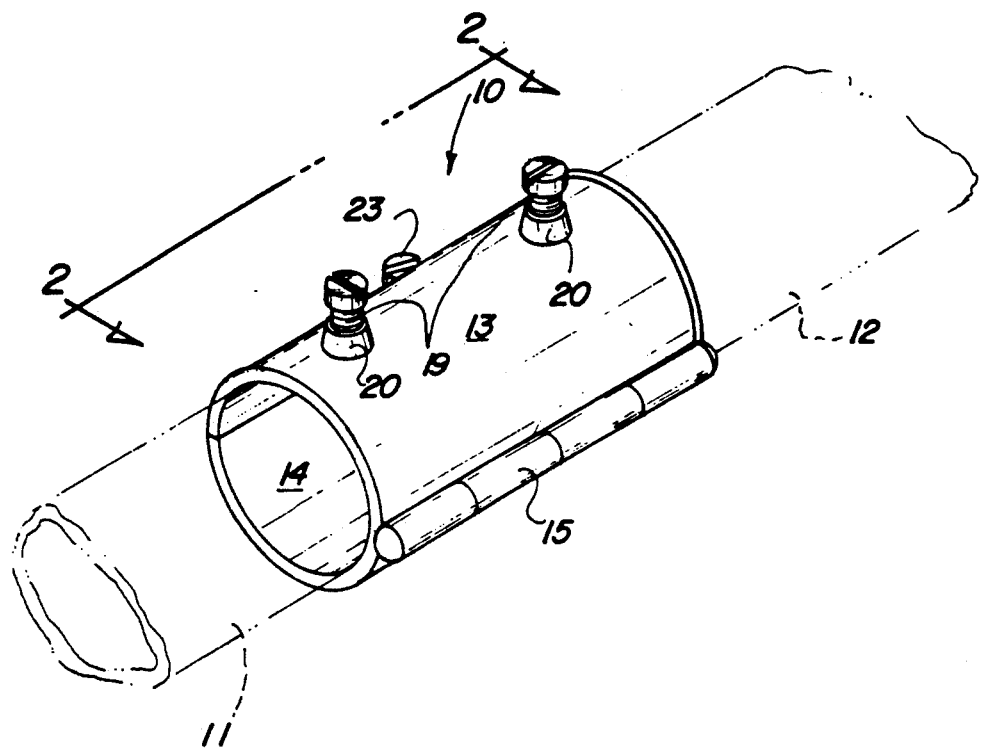
FIG. 1 is an isometric illustration of the instant invention.
Figure 2:
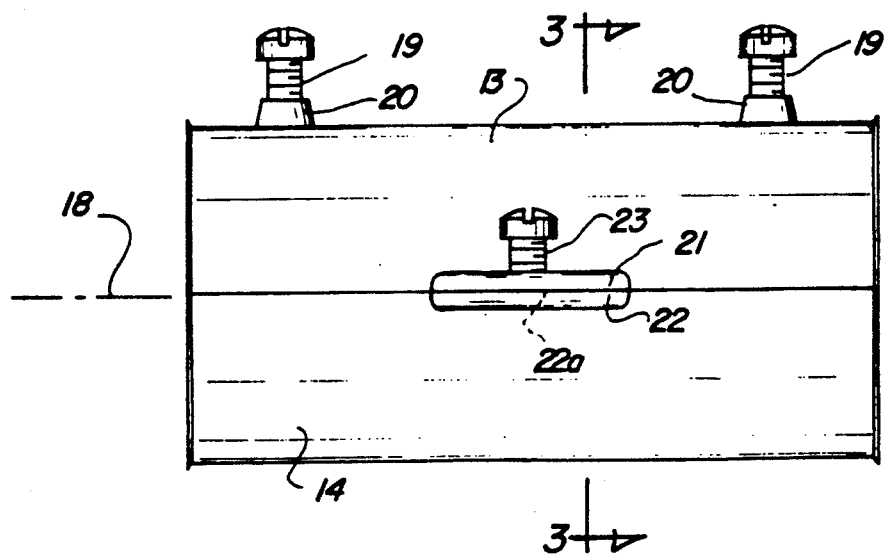
FIG. 2 is an orthographic view, taken along the lines 2—2 of FIG. 1 in the direction indicated by the arrows.
Figure 3:
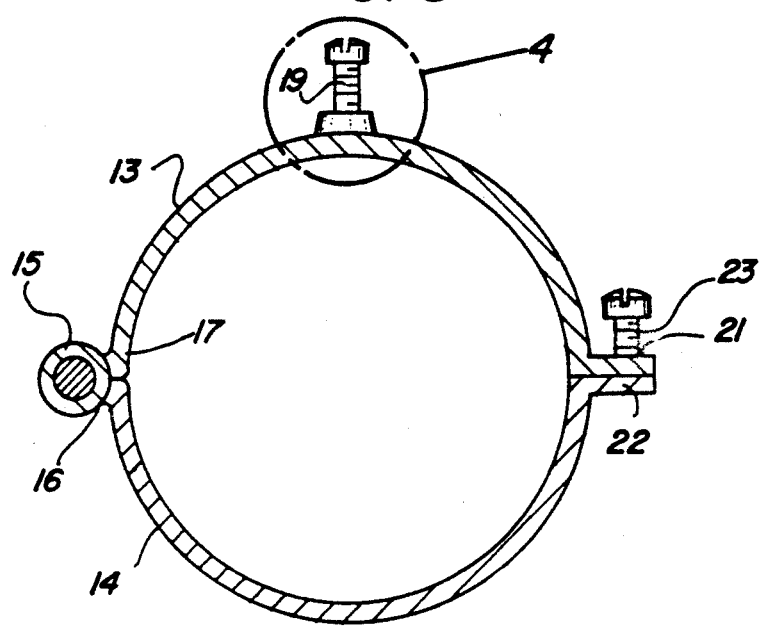
FIG. 3 is an orthographic view, taken along the lines 3—3 of FIG. 2 in the direction indicated by the arrows.
Figure 4:
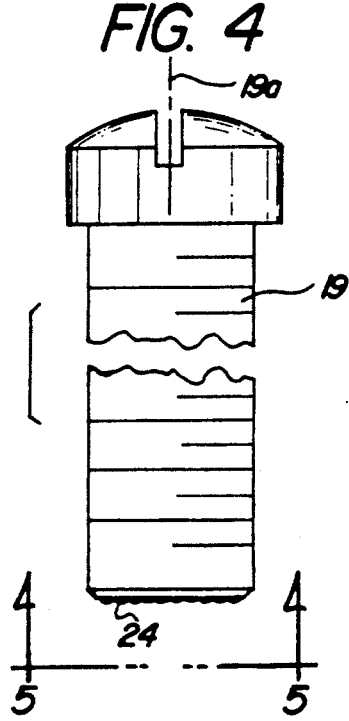
FIG. 4 is an enlarged view of the clamp rod structure as set forth in section 4 of FIG. 3.
Figure 5:
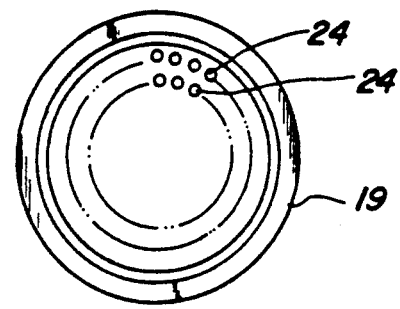
FIG. 5 is an orthographic view, taken along the lines 5—5 of FIG. 4 in the direction indicated by the arrows.

With reference now to the drawings, and in particular to FIGS. 1 to 10 thereof, a new and improved conduit coupling embodying the principles and concepts of the present invention and generally designated by the reference numeral 10 will be described.

More specifically, the conduit coupling 10 of the instant invention essentially comprises the alignment and mounting of a first conduit 11 relative to a second conduit 12. The coupling 10 of the invention is formed of a first semi-cylindrical shell 13 mounted coextensively relative to a second semi-cylindrical shell 14. A first shell first edge 16 and a second shell first edge 17 are mounted in a parallel coextensive relationship relative to one another having a hinge 15 secured therebetween permitting pivotal and relative movement of the first and second semi-cylindrical shells together. When the first and second shells 13 and 14 are arranged in a first clamped position, as illustrated in FIG. 1 for example, the coupling structure 10 is defined about a coupling access 18 that is coincident with the relative axes of the first and second semi-cylindrical shells when the first and second shells are in a spaced second position to receive the first and second conduits 11 and 12.

The first semi-cylindrical shell 13 includes a plurality of externally threaded clamp rods 19 orthogonally oriented relative to the first shell's axis, with the clamp rods 19 threadedly received within internally threaded bosses 20 integrally formed projecting exteriorly of the first shell 13. The clamp rods 19 are positioned adjacent opposed ends of the first shell to insure securement of the respective first and second conduits 11 and 12 directed into the conduit coupling 10 from opposed ends of the coupling.

A first shell second edge flange 21 and a second shell second edge flange 22 are formed at respective first and second end edges of the first and second shells, with the first and second shell flanges 21 and 22 respectively projecting exteriorly of the first and second shells and radially aligned relative to the first and second shells. An externally threaded flange fastener 23 is threadedly directd through the first flange 21 and threadedly received within an internally threaded second flange bore 22a to clamp the first and second shells together to form a unitary configuration in securement of the first and second conduits 11 and 12. It should be noted that a bottom surface of each clamp rod 19 (see FIGS. 4 and 5) are each formed orthogonally relative to a respective clamp rod axis 19a. The bottom surface is further formed with a plurality of concentric arrays of clamp rod ridges 24. The circular arrays permit ease of rotation of the ridges relative to an underlying conduit while simultaneously effecting a locking arrangement to insure frictional engagement with an underlying conduit received within the coupling structure of the invention.

Figure 6:
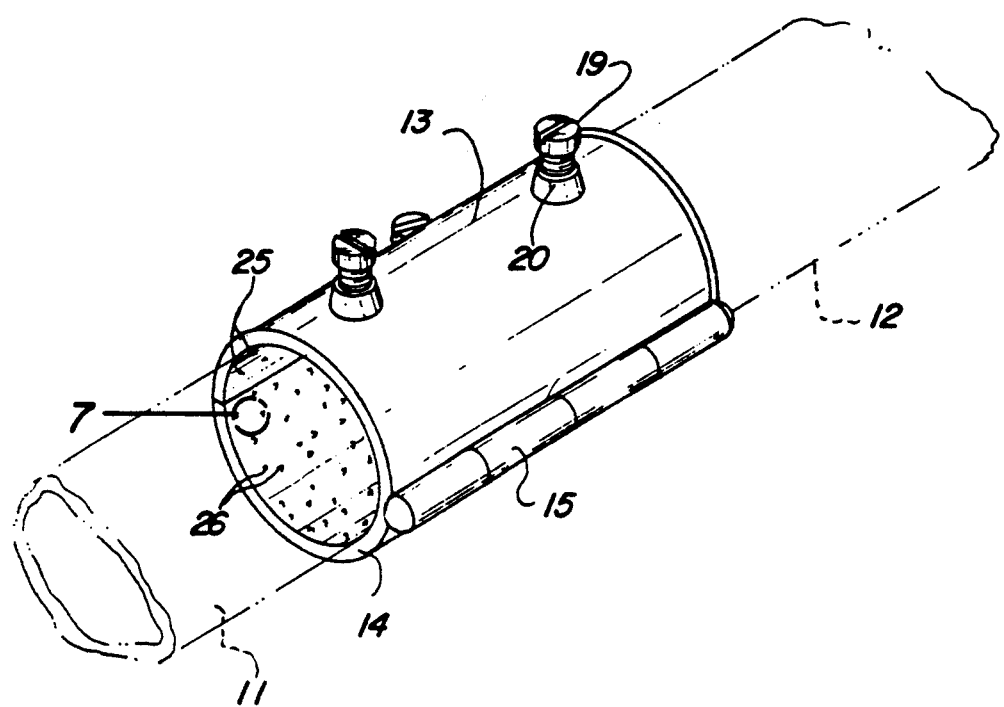
FIG. 6 is an isometric illustration of the invention incorporating securement projections formed to interior surfaces of the shell structure.
Figure 7:
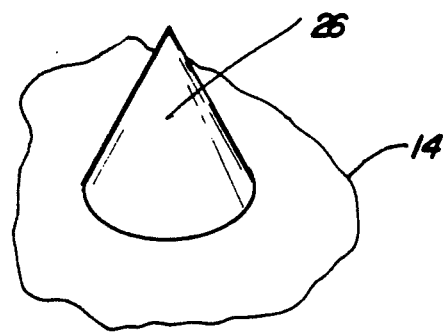
FIG. 7 is an isometric illustration of section 7 as set forth in FIG. 6.

The FIGS. 6 and 7 illustrate the use of respective first and second shell conical projections 25 and 26 mounted coextensively about respective interior surfaces of the first and second shells 13 and 14 to enhance engagement with the first and second conduits 11 and 12.

Figure 8:
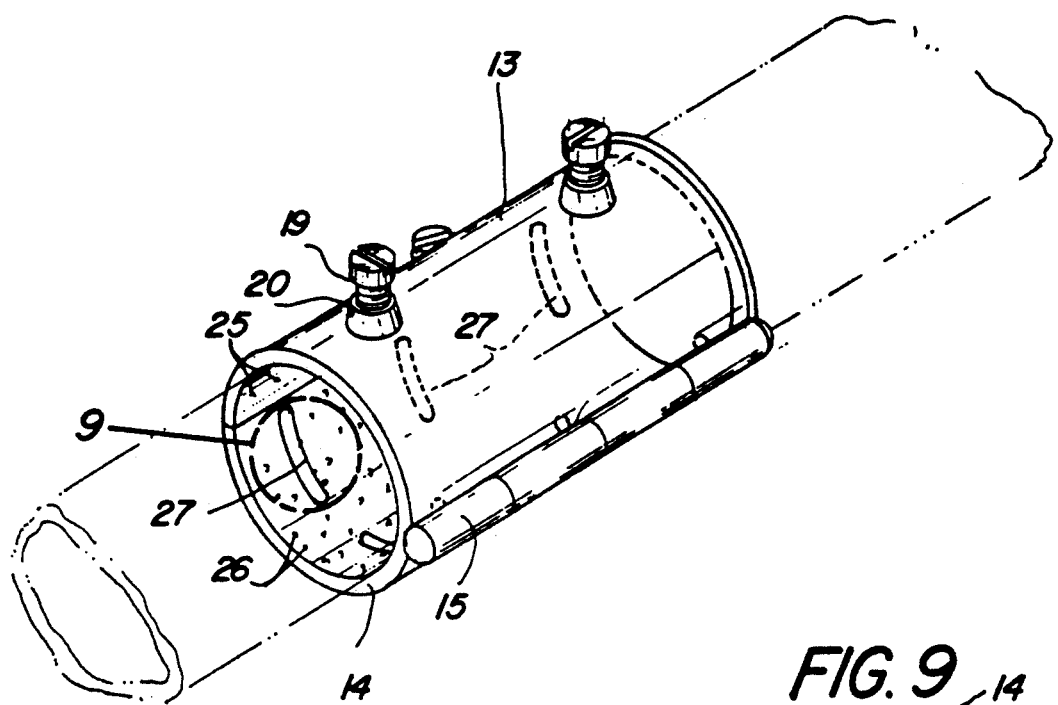
FIG. 8 is an isometric illustration of the invention further including adhesive reservoir members mounted within the organization.
Figure 9:
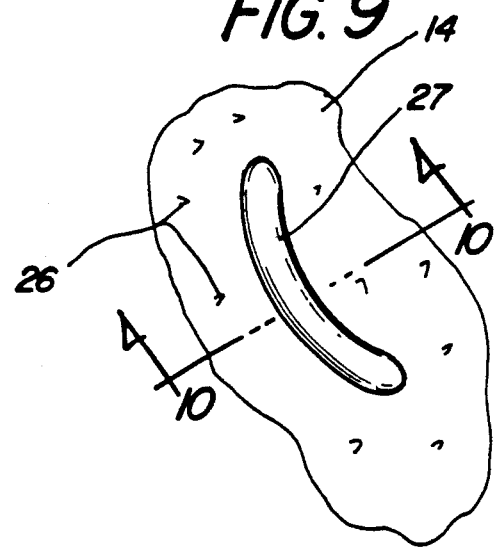
FIG. 9 is an isometric illustration of section 9 as set forth in FIG. 8.
Figure 10:
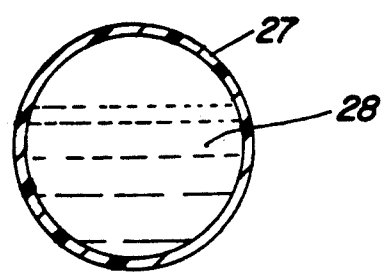
FIG. 10 is an orthographic view, taken along the lines 10—10 of FIG. 9 in the direction indicated by the arrows.

The FIGS. 8 and 9 indicate the further employment by the invention of a plurality of flexible adhesive filled polymeric rupturable reservoirs 27 typically formed of a flexible housing containing an adhesive 28 therewithin. In this manner, upon clamping of the first and second shells together, the adhesive reservoirs are ruptured enhancing and maintaining securement of the first and second conduits within the coupling structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A conduit coupling for mounting a first conduit and a second conduit in an end-to-end relationship, wherein the conduit coupling includes a first semi-cylindrical shell mounted coextensively to a second semi-cylindrical shell, with the first shell having a first shell first edge and the second shell having a second shell second edge, the first shell first edge and the second shell second edge are arranged in a parallel coextensive relationship relative to one another, including a hinge secured to the first shell first edge and the second shell first edge, and a first shell second edge mounted coextensively and parallel to a second shell second edge, with the first shell second edge including a first shell second edge flange and the second shell second edge including a second edge flange, wherein the first shell second edge flange and the second shell second edge flange are arranged in a coextensive confronting relationship relative to one another, and the first shell and the second shell are defined about a respective first shell axis and a second shell axis, wherein the first shell axis and the second shell axis are coextensive when the first shell second edge and the second shell second edge are in contiguous relationship relative to one another, and a fastener means mounted to the first shell second edge flange cooperative with the second shell second edge flange for securement of the first shell to the second shell, and the fastener means includes an externally threaded flange fastener threadedly received orthogonally through the first shell second edge flange, and the second shell second edge flange including an internally threaded flange bore for receiving the flange fastener therethrough, and the first shell includes a first end and a second end, wherein the first end and second end each include a respective internally threaded boss extending upwardly of the first shell, and each boss including an internally threaded clamp rod directed through each respective boss, wherein each clamp rod is orthogonally oriented relative to the first shell axis, and each clamp rod includes a clamp rod bottom surface positioned within the first shell and the clamp rod bottom surface is orthogonally oriented relative to a clamp rod axis, and the clamp rod bottom surface includes a plurality of concentric circular arrays of ridges for engagement with one of said first and second conduits, and the first shell includes a first shell interior surface, the second shell includes a second shell interior surface, wherein the first shell interior surface and the second shell interior surface are arranged in a confronting relationship relative to one another, and the first shell interior surface includes a plurality of first shell conical projections and the second shell interior surface includes a plurality of second shell conical projections, and the second shell interior surface includes a plurality of flexible polymeric rupturable reservoirs mounted fixedly to the second shell interior surface, and each reservoir includes a fluid adhesive contained therewithin, whereupon clamping of the first shell relative to the second shell upon receiving the first conduit and second conduit within the first shell and the second shell effects rupturing of the reservoirs to direct said adhesive to secure the first conduit and second conduit relative to the second shell.

* * * * *